United States Patent [19]

Ikeda

[11] Patent Number: 4,646,228
[45] Date of Patent: Feb. 24, 1987

[54] GRAPHIC DISPLAY DEVICE
[75] Inventor: Yoshiaki Ikeda, Hachioji, Japan
[73] Assignee: Fanuc Ltd, Minamitsuru, Japan
[21] Appl. No.: 621,915
[22] PCT Filed: Oct. 14, 1983
[86] PCT No.: PCT/JP83/00347
§ 371 Date: Jun. 14, 1984
§ 102(e) Date: Jun. 14, 1984
[87] PCT Pub. No.: WO84/01634
PCT Pub. Date: Apr. 26, 1984

[30] Foreign Application Priority Data
Oct. 16, 1982 [JP] Japan ................. 57-181596

[51] Int. Cl.⁴ ............... G05B 23/02; G05B 19/405
[52] U.S. Cl. ...................... 364/192; 364/474; 340/721
[58] Field of Search .......... 340/709, 721, 734, 745, 340/747; 364/188, 189, 191, 192, 171, 146, 521, 474

[56] References Cited
U.S. PATENT DOCUMENTS

| 4,328,550 | 5/1982 | Weber | 364/192 |
| 4,396,977 | 8/1983 | Slater et al. | 364/188 |
| 4,490,781 | 12/1984 | Kishi et al. | 364/521 |
| 4,519,026 | 5/1985 | Nozawa et al. | 364/171 |

FOREIGN PATENT DOCUMENTS 55-37250 3/1980 Japan .
PCT/HU81/-00022 11/1981 PCT Int'l Appl. .

Primary Examiner—Jerry Smith
Assistant Examiner—Allen MacDonald
Attorney, Agent, or Firm—Staas & Halsey

[57] ABSTRACT

The present invention provides a graphic display device which displays the path of travel of a tool (the locus of the tool) commanded by a numerical control (NC) machining program and is designed to facilitate easy confirmation of the contents of the NC machining program on which each path of travel of the tool is based. To this end, according to the present invention, each travel command block is prestored corresponding to the starting point of each tool locus prepared by interpreting the travel command block, and a cursor is moved along the tool locus by the application of a cursor move command, and when the cursor passes across the starting point of each tool locus, the travel command block corresponding to the starting point is displayed on a display screen.

4 Claims, 5 Drawing Figures

GRAPHIC DISPLAY DEVICE

BACKGROUND OF THE INVENTION

The present invention relates to a graphic display device and, more particularly, to a graphic display device which displays the contents of a numerical control (NC) machining program as the locus of a tool.

Conventional display devices of this kind are equipped with functions of displaying an NC machining program as well as a tool locus, but these displays are provided independently of each other, and hence do not bear a clear correspondence therebetween. Because of this, finding an error at a certain place along the tool locus being displayed and correcting the corresponding part (block) of the NC machining program is not easy because it is not easy to pick up or determine the associated block from the NC machining program; this is all the more difficult in the case where the tool locus is partly displayed on an enlarged scale.

SUMMARY OF THE INVENTION

An object of the present invention is to move a cursor along the tool locus being displayed on a screen and to display thereon, together with the tool locus, the NC machining program block corresponding to the locus at the position of the cursor, allowing ease in confirming the contents of an NC machining program on which the tool locus is based. An NC machining program is input into graphic form generating means, where it is interpreted and a series of graphic data necessary for displaying a tool locus are prepared. The graphic data thus produced are each stored in graphic data storage means, the contents of which are provided to a display unit for displaying the tool locus on a screen. Further, an NC machining program block for each graphic form is stored in a program storage means in correspondence to the starting point of the graphic form indicated by each graphic data. Upon application of a cursor move command, cursor control means refers to the contents of the graphic data storage means and moves a cursor along the tool locus being displayed. Program display control means detects whether the cursor has passed through the starting point stored in the program storage means and, if so, reads out of the program storage means the NC machining program block stored therein corresponding to the starting point, for display on the screen of the display unit 3.

DESCRIPTION OF THE PREFERRED EMBODIMENTS

Figure 1:
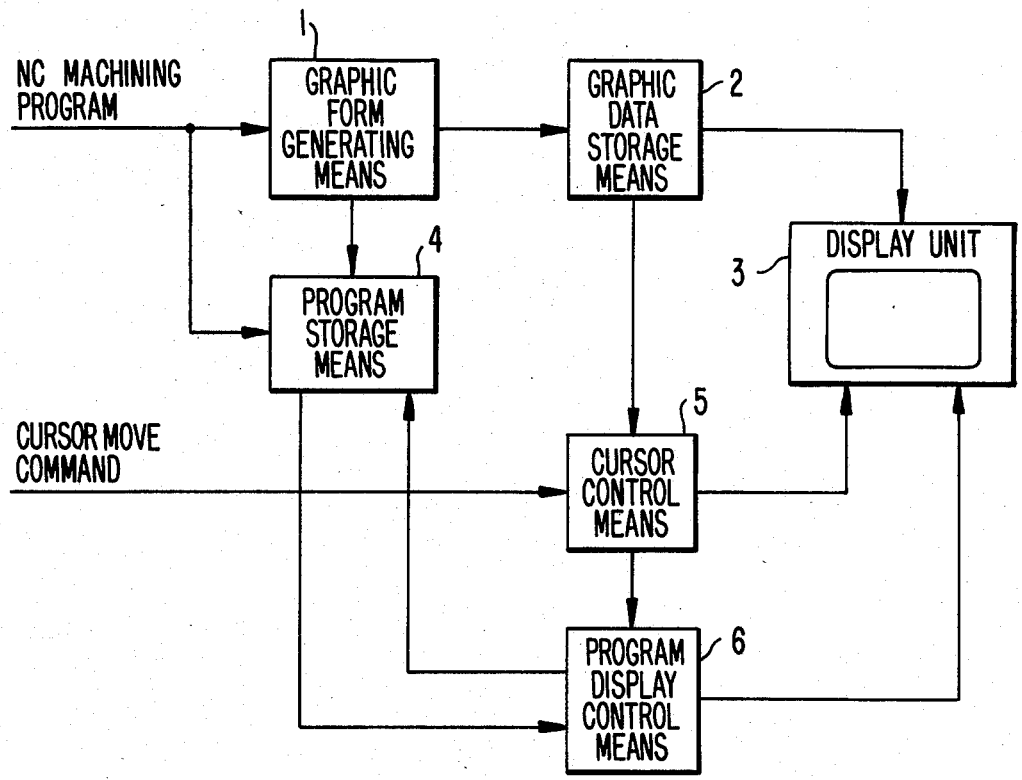
FIG. 1 is a diagram of the functional arrangement of the graphic display device of the present invention.

FIG. 1 is a diagram of the arrangement of the graphic display device of the present invention. In FIG. 1, an NC machining program is input into graphic form generating means 1, where it is interpreted and a series of graphic data necessary for displaying a tool locus are produced. The graphic data thus produced are stored in graphic data storage means 2 and the contents thereof are provided to a display unit 3 for displaying the tool locus on a screen. An NC machining program block for each graphic form is stored in program storage means 4 with respect to the starting point of the graphic form indicated by the graphic data. Upon application of a cursor move command, cursor control means 5, with reference to the contents of the graphic data storage means 2, and moves a cursor along the tool locus being displayed. Program display control means 6 detects whether the cursor has passed through the starting point stored in the program storage means 4 and, if so, reads out of the program storage means 4 the NC machining program block stored therein corresponding to the starting point, for display on the screen of the display unit 3.

Figure 2:
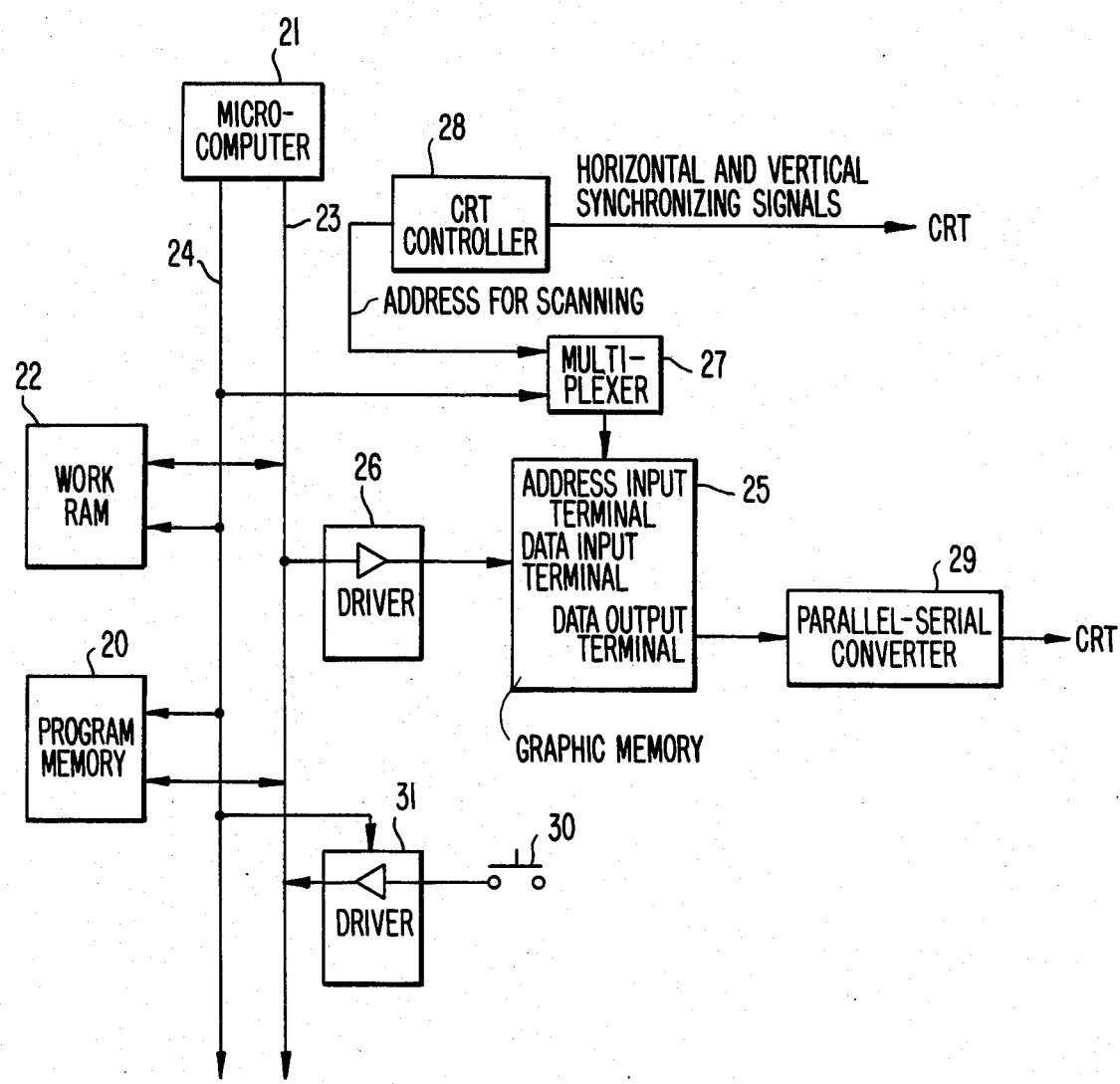
FIG. 2 is a block diagram illustrating the principal part of an example of the hardware structure of the graphic display device of the present invention.

In FIG. 2, which illustrates the hardware structure of the present invention, a program memory 20 for storing an NC machining program made up of a series of NC machining program blocks and a work RAM 22 for temporary data processing by a microcomputer 21 are connected to a data bus 23 and an address bus 24 of the microcomputer 21, and they are both accessible by the microcomputer 21. Known programs for implementing a graphic form generating function, a cursor control function and a program display function are stored in a memory of the microcomputer 21. A graphic memory 25 is a writable/readable memory which has storage areas corresponding to the display screen and has its data input terminal connected to the data bus 23 via a data driver 26 and its address input terminal connected to the address bus 24 and a CRT controller 28 via a multiplexer 27, respectively. The output of the graphic memory is input via a parallel-serial converter 29 to a CRT device not shown. The CRT controller 28 generates an address for scanning the graphic memory 25 and horizontal and vertical synchronizing signals for synchronization of the display. An address from the microcomputer 21 and the scanning address are multiplexed by the multiplexer 27. A cursor move button 30 is a button which is used for moving a cursor along a graphic form being displayed, and its state can be read by the microcomputer 21 via a data driver 31.

Figure 3:
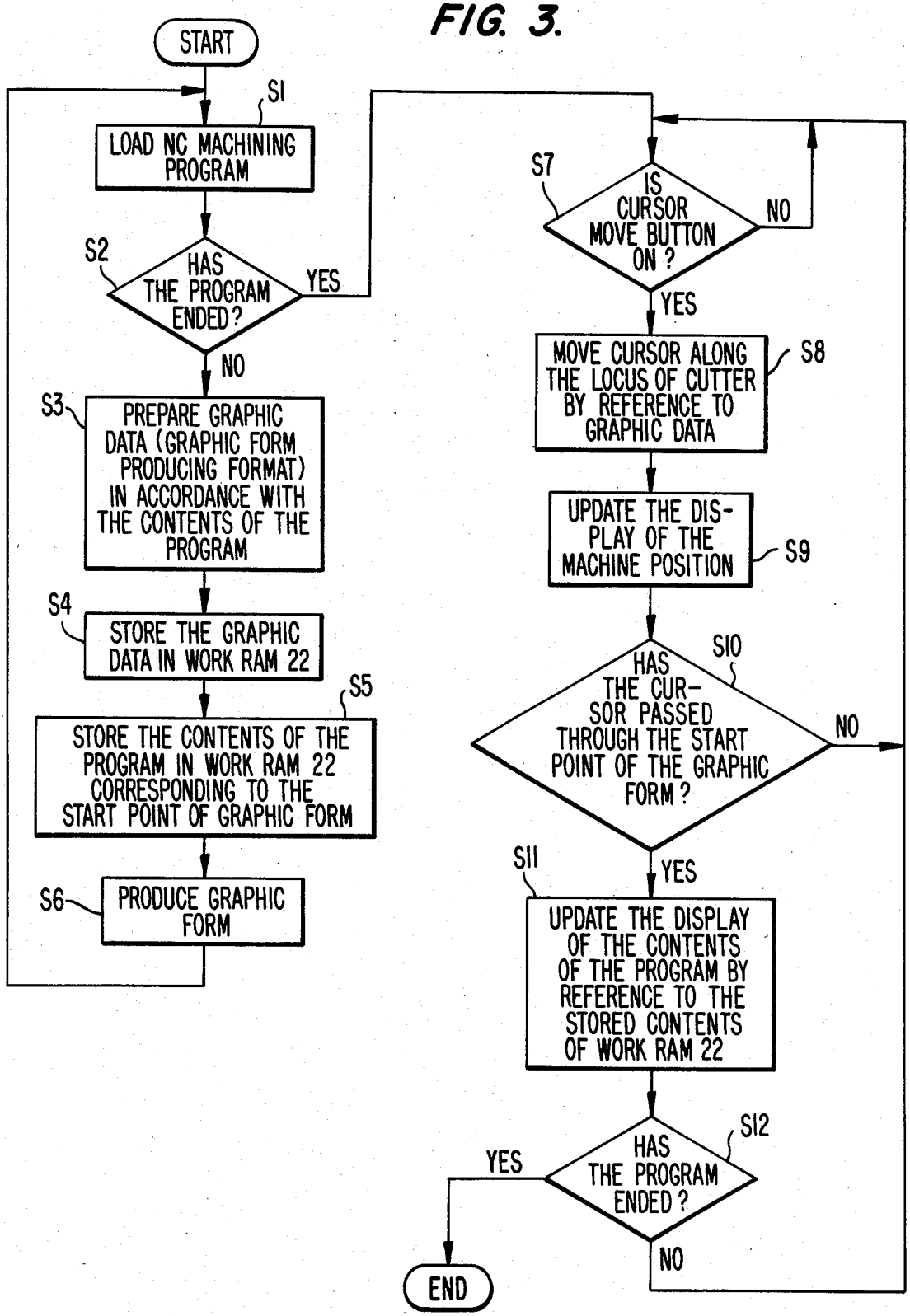
FIG. 3 is a flowchart illustrating an example of the software structure of the graphic display device of the present invention.

FIG. 3 is a flowchart showing an example of the software arrangement of the graphic display device of the present invention. A description will be given, with reference to this flowchart, of the operation of the device illustrated in FIG. 2.

In a mode of displaying a tool locus, the microcomputer 21 first reads out the NC machining program from the program memory 20 block by block (step S1) and prepares, by a known method, graphic data (using a graphic form generating format) following the contents of each NC machining program block (step S3). For example, when the content indicated by a certain block is a command for movement from a point P1 to a point P2, data necessary for displaying a straight line 11 from the point P1 to the point P2 is prepared. The graphic data thus prepared is stored in the work RAM 22 (step S4).

Further, the microcomputer 21 stores, corresponding to the starting point of the graphic form represented by the graphic data thus prepared, into the work RAM 22 the NC machining program block related to the graphic data (step S5). In the case of the example, a move command along the straight line 11 from the point P1 is stored in RAM 22.

Next, the microcomputer 21 writes data into the graphic memory 25 on the basis of the graphic data prepared as described above, generating the graphic form (step S6). The processes of steps S1 to S6 are repeatedly performed until the NC machining program is finished (step S2). After this, the contents of the graphic memory 25 are cyclically read out by the scanning address from the CRT controller 28 and provided to the CRT device, displaying the tool locus path on the display screen.

Upon completion of the above-described processing for the NC machining program, the microcomputer 21 detects whether the cursor move button 30 is being pressed or not (step S7) and, if so, refers to the graphic data stored in the work RAM 22 and moves the cursor along the tool path being displayed, at a predetermined speed (step S8). Simultaneously with the cursor movement, the machine position on the tool locus indicated by the cursor is obtained and displayed on the display screen (step S9). Such a cursor movement as described above can be accomplished, for instance, by moving the cursor, instead of producing the graphic form, in the same sequence as the preparation of the graphic form. That is, upon application of an input for the cursor movement, software proceeds to the routine for preparing the graphic form of the tool locus. Then software performs interpolation in the same manner as in the case of preparing the graphic form and, every moment, it displays the resulting values of X and Y (the machine position) and decides whether the position being displayed is the starting point of each segment. In this case, however, the cursor is moved to the position (X,Y) obtained by the interpolation instead of writing the results in the RAM.

Figure 4A:
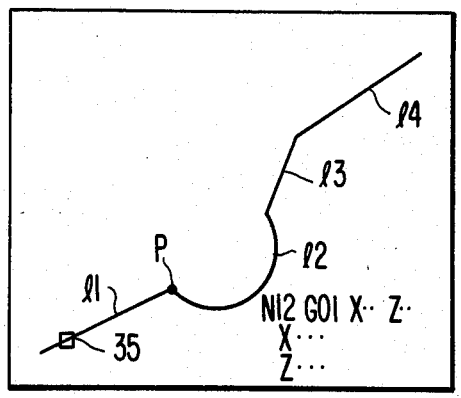
FIGS. 4(A) and 4(B) are schematic diagrams showing examples of displays.
Figure 4B:
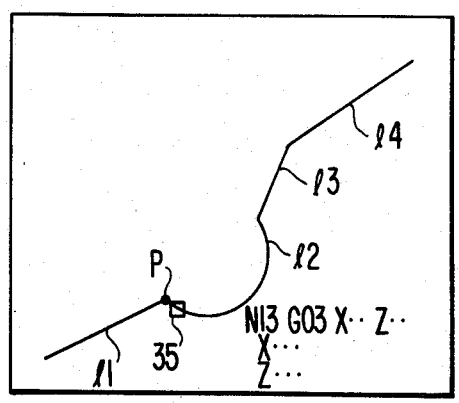

During the cursor movement the microcomputer 21 decides whether the cursor has passed a machining block starting point stored in the work RAM 22 (step S10) and, when the cursor moves across each starting point, reads out the NC machining program block stored in the work RAM 22 corresponding to the starting point and displays it on the display screen (step S11). For example, in the case where the tool locus is expressed by straight lines 11, 13 and 14 and a circular arc 12 as shown in FIG. 4(A) when the cursor 35 lies on the straight line 11, and NC machining program block N12G01X ... Z ... related to the straight line 11 and the machine position X ... Z ... of the cursor 35 are displayed, and when the cursor 35 moves across the starting point P of the curve 12 as shown in FIG. 4(B), an NC machining program block N13G03X ... Z ... related to the curve 12 is displayed along with the machine position X ... Z ... of the cursor. Incidentally, such a character display can also be provided through the use of the graphic memory 24 but, in general, it is carried out by the employment of a character memory (not shown).

While in the above embodiment the machine position is displayed along with the program, it is also possible to adopt such an arrangement in which the display of the former is omitted.

According to the present invention, an NC machining program block, which is associated with each graphic form represented by graphic data prepared, is prestored corresponding to the starting point of the graphic form, a cursor is moved, by the application of a cursor move command, along a tool locus and the contents of the NC machining program block corresponding to the graphic form at the position of the cursor are displayed. This gives a clear display of the relationship between the tool locus and the NC machining program and makes it possible to find out the place of the NC machining program that needs to be corrected, allowing ease in correction of the program. Especially, in the case of an enlarged display, the position of the part being displayed, relative to the entire tool locus, is unclear and it is difficult to identify which cutting region is being displayed, making it very difficult to extract the corresponding NC machining program block, but the present invention solves such a problem because the respective portion of the NC machining program is displayed, along with the tool locus.

What is claimed is:

1. A graphic display device which prepares graphic data representing a tool locus, using graphic form generating means, from an NC machining program and displays the tool locus on a display screen, said device comprising:
   graphic data storage means for storing the graphic data;
   program storage means for storing an NC machining program related to each grahic form represented by the graphic data with respect to a starting point of the graphic form;
   cursor move command input means for inputting a cursor move command;
   cursor control means for responding to the cursor move command from said cursor move command input means by accessing the graphic data stored in said graphic data storage means and displaying a cursor along the tool locus; and
   program display control means for responding to the passage of the cursor across each starting point stored in said program storage means by reading out of said program storage means the NC machining program stored therein corresponding to the starting point and displaying the program on the display screen.

2. A method for displaying a machine tool path and a numerical control program corresponding thereto where the numerical control program is divided into program blocks, comprising the steps of:
   (a) converting the program blocks into a path display;
   (b) responding to a cursor move command to move a cursor along the displayed path; and
   (c) comparing the position of the cursor on the displayed path to the program blocks, and displaying the program block corresponding thereto.

3. A method as recited in claim 2, further comprising the step (d) of displaying the coordinates of the tool locus corresponding to the position of the cursor on the displayed path.

4. A method as recited in claim 3, wherein each program block has a starting point and said step (c) comprises the steps of:
   (ci) comparing the position of the cursor on the displayed path to the start points as the cursor moves; and
   (cii) displaying the program block corresponding to the start point which most recently equaled the position of the cursor.

* * * * *